(12) United States Patent
Challenor et al.

(10) Patent No.: US 10,384,784 B2
(45) Date of Patent: Aug. 20, 2019

(54) TABLE LEG

(71) Applicant: ACRO AIRCRAFT SEATING LIMITED, Crawley (GB)

(72) Inventors: Adam Challenor, Banbury (GB); Toby Hugh, Redhill (GB)

(73) Assignee: Acro Aircraft Seating Limited, Crawley (GB)

( * ) Notice: Subject to any disclaimer, the term of this patent is extended or adjusted under 35 U.S.C. 154(b) by 77 days.

(21) Appl. No.: 15/462,701

(22) Filed: Mar. 17, 2017

(65) Prior Publication Data

US 2017/0267354 A1  Sep. 21, 2017

(30) Foreign Application Priority Data

Mar. 18, 2016 (GB) .................................. 1604653.4

(51) Int. Cl.
  *A47B 39/00* (2006.01)
  *B64D 11/06* (2006.01)

(52) U.S. Cl.
  CPC ...... *B64D 11/0638* (2014.12); *B64D 11/0646* (2014.12)

(58) Field of Classification Search
  CPC .. B64D 11/0646; B64D 11/0638; B60N 2/02; A47C 4/02; A47C 4/022; A47C 13/005; A47C 13/00; A47C 4/00
  USPC .......................... 297/173, 118, 133, 134, 135
  See application file for complete search history.

(56) References Cited

U.S. PATENT DOCUMENTS

| 3,049,374 | A | * | 8/1962 | Nance | B60N 3/004 297/146 |
| 4,511,178 | A |   | 4/1985 | Brennan | |
| 5,169,209 | A |   | 12/1992 | Beroth | |
| 5,845,964 | A | * | 12/1998 | Phoon | A47C 7/70 297/162 |
| 5,876,092 | A | * | 3/1999 | An | B60N 3/004 297/146 |
| 6,085,666 | A | * | 7/2000 | Anderson | B60N 3/004 108/134 |
| 6,601,523 | B2 | * | 8/2003 | Jensen | B60N 3/004 108/152 |

(Continued)

FOREIGN PATENT DOCUMENTS

| DE | 10 2005 015237 A1 | 10/2006 |
| EP | 0 112 170 A2 | 6/1984 |

(Continued)

OTHER PUBLICATIONS

Extended European Search Report dated Aug. 30, 2017, by the European Patent Office for corresponding European Patent Application No. 14161544.6, 8 pp.

(Continued)

*Primary Examiner* — Chi Q Nguyen
(74) *Attorney, Agent, or Firm* — Klarquist Sparkman, LLP

(57) ABSTRACT

A table leg has a first connector for connecting the table leg in pivotable engagement with a seat such that the table leg is pivotable between first and second leg positions, and a mating part for restricting movement of the table leg relative to the seat. The mating part is for allowing removal of the table leg from the seat when the table leg is in the first leg position and for preventing removal of the table leg from the seat when the table leg is in the second leg position.

15 Claims, 10 Drawing Sheets

(56) References Cited

U.S. PATENT DOCUMENTS

| | | | | |
|---|---|---|---|---|
| 7,500,716 B2* | 3/2009 | Guerin | ................... | B60N 3/004 |
| | | | | 297/146 |
| 8,256,835 B2* | 9/2012 | Brink | ....................... | A47C 7/70 |
| | | | | 297/145 |
| 8,905,470 B2* | 12/2014 | Shih | ....................... | B60N 3/004 |
| | | | | 297/146 |
| 8,934,063 B2* | 1/2015 | Boyer, Jr. | .............. | H04N 5/655 |
| | | | | 297/144 |
| 2007/0283855 A1* | 12/2007 | Pozzi | ................... | A47B 23/043 |
| | | | | 108/44 |
| 2009/0174234 A1* | 7/2009 | Vignal | ................... | B60N 3/002 |
| | | | | 297/163 |
| 2011/0204683 A1* | 8/2011 | Roy | ........................ | B60N 2/24 |
| | | | | 297/163 |
| 2012/0091764 A1 | 4/2012 | Cailleteau | | |
| 2012/0313403 A1 | 12/2012 | Aguirre et al. | | |
| 2016/0152169 A1* | 6/2016 | Zheng | ................ | B64D 11/0636 |
| | | | | 297/163 |

FOREIGN PATENT DOCUMENTS

| | | |
|---|---|---|
| EP | 0112170 | 6/1984 |
| WO | WO 2015/123271 | 8/2015 |

OTHER PUBLICATIONS

Combined Search and Examination Report dated Sep. 16, 2016, by the Intellectual Property Office of the United Kingdom, for UK Patent Application No. GB 1604653.4, 7 pp.

\* cited by examiner

TABLE LEG

CROSS REFERENCE TO RELATED APPLICATION

This application claims priority to United Kingdom Patent Application No. GB1604653.4, filed Mar. 18, 2016, which is incorporated herein by reference in its entirety.

TECHNICAL FIELD

The present invention relates to table legs for seats, in particular for aircraft seats.

BACKGROUND ART

Various types of aircraft seat are known which generally comprise a seat base, a seat back, one or more armrests and a table which is moveable between a stowed position against the seat back and a pulled-down "in use" position.

Due to the nature of their use, it is common for seat tables to be damaged and require replacement. However, they are often difficult to remove since they are generally attached via a plurality of bolts and/or screws. This can be particularly problematic because access to the bolts and/or screws is often hampered by other components of the seat.

It is, therefore, an object of the present invention to seek to alleviate the above identified problems.

SUMMARY OF THE INVENTION

According to one aspect of the present invention, there is provided a table leg comprising a first connector for connecting the table leg in pivotable engagement with a seat such that the table leg is pivotable between first and second leg positions, and a securing means for restricting movement of the table leg relative to the seat, wherein the securing means is for allowing removal of the table leg from the seat when the table leg is in the first leg position and for preventing removal of the table leg from the seat when the table leg is in the second leg position.

Preferably, the first leg position is a maintenance position and the second leg position is an "in use" position.

Preferably, the first connector can be slid or pulled out of engagement with the seat, preferably the frame, when the table leg is in the first leg position.

The present invention provides a significant advantage over known methods of attaching table legs to aircraft seats. Remarkably, there is no need for a connection means to be provided which requires an engineer to tighten and/or provide a nut and bolt or screw. The table leg of the present invention is provided with a connection means that cannot be over-tightened, under-tightened or incorrectly installed; rather, an engineer simply needs to position the table leg in the first leg position and move it into engagement with a seat. Once in engagement with the seat, movement of the table leg from the first leg position to the second leg position locks the table leg in connection with the seat. In the event that the table leg requires replacement or repair, an engineer can quickly and easily remove the table leg by moving the table leg from the second leg position to the first leg position.

Preferably, the table leg is connectable to a seat which is configured for controlling movement of the table leg between said first and second leg positions.

Preferably, the table leg is connectable to a seat which comprises a control means for controlling movement of the table leg between said first and second leg positions.

Preferably, the table leg is connectable to a seat which is moveable between first and second seat positions, wherein when the seat is in the second seat position, movement of the table leg from the second leg position to the first leg position is prevented.

Preferably, the first seat position is a maintenance position and the second seat position is an "in use" position.

Preferably, the seat comprises a seat back and the seat back is pivotable between first and second seat back positions.

Preferably, the seat back is pivoted forward in the first seat back position and substantially upright in the second seat back position.

Preferably, the table leg is connected to a table top and movement of the table leg from the second leg position to the first leg position is prevented via abutment of the table top against the seat.

Preferably, the table leg comprises one or more protrusions for abutment with a seat and for preventing movement of the table leg from the second leg position to the first leg position via abutment of the one or more protrusions with the seat, when the table leg is connected to the seat.

Preferably, the table leg comprises one or more protrusions for abutment with a seat back and for preventing movement of the table leg from the second leg position to the first leg position via abutment of the one or more protrusions with the seat back, when the table leg is connected to the seat.

Preferably, the first connector is for connecting the table leg in pivotable engagement with a frame of the seat.

Preferably, the first connector comprises a first mating part for engagement with a second mating part on the seat, preferably the frame.

Preferably, the first mating part is a female mating part and the second mating part is a male mating part. Alternatively, the first mating part is a male mating part and the second mating part is a female mating part.

Preferably, the female mating part comprises a recess for engagement with the male mating part.

Preferably, the female mating part comprises a C-shaped recess for engagement with the male mating part.

Preferably, the male mating part comprises a bar or protrusion, for example a pivot pin.

Preferably, the female mating part comprises an insert for engagement with the male mating part.

Preferably, the insert is a bearing insert for rotatable engagement with the male mating part.

Preferably, the female mating part comprises a recess and the insert comprises a collar positioned within the recess.

Preferably, the securing means comprises a first mating part for engagement with a second mating part on the seat, preferably the frame.

Preferably, the first mating part is a female mating part and the second mating part is a male mating part. Alternatively, the first mating part is a male mating part and the second mating part is a female mating part.

Preferably, the female mating part comprises a recess for engagement with the male mating part.

Preferably, the female mating part comprises a channel for engagement with the male mating part.

Preferably, the channel is a curved channel.

Preferably, the channel is curved around a pivot point of the first connector.

Preferably, the channel comprises a stop for abutment with the male mating part and for restricting pivotable movement of the table leg.

Preferably, the channel comprises an entrance for receiving the male mating part.

Preferably, the entrance is positioned at a first end of the channel and a stop for abutment with the male mating part is positioned at a second end of the channel.

Preferably, the first mating part is a female mating part and the entrance is provided in a longitudinal edge of the table leg.

Preferably, the first mating part is a female mating part and the entrance is provided in a rearward facing edge of the table leg. In this respect, it will be appreciated that a rearward facing edge of the table leg is an edge of the table leg facing in the same direction as the rear of the seat.

Preferably, the second mating part is a female mating part and the entrance is provided in a forward facing edge of the seat, preferably the frame.

Preferably, the entrance is flared. Preferably, a lower edge of the entrance is flared. This is particularly advantageous since it improves the ease of mating of the channel with a male mating part.

Preferably, the male mating part comprises a bar or protrusion, for example a stop pin.

Preferably, the second mating part is a male mating part and comprises a bar or protrusion on the seat, preferably the frame.

Preferably, the first mating part is a male mating part and comprises a bar or protrusion on the table leg.

Preferably, the table leg comprises a second connector for connecting the table leg to a table top.

Preferably, the second connector comprises a channel for receiving a protrusion of a table.

According to another aspect of the present invention, there is provided a table comprising one or more, preferably two, table legs as described herein.

According to another aspect of the present invention, there is provided a seat comprising one or more tables as described herein.

Preferably, the seat comprises a seat base, a seat back and a seat frame.

Preferably, the seat is configured for controlling movement of the table leg between said first and second leg positions.

Preferably, the seat comprises a control means for controlling movement of the table leg between said first and second leg positions.

Preferably, the seat is moveable between first and second seat positions, wherein when the seat is in the second seat position, movement of the table leg from the second leg position to the first leg position is prevented.

Preferably, the first seat position is a maintenance position and the second seat position is an "in use" position.

Preferably, the seat comprises a seat back and the seat back is pivotable between first and second seat back positions.

Preferably, the seat back is pivoted forward in the first seat back position and substantially upright in the second seat back position.

Preferably, the table leg is connected to a table top and movement of the table leg from the second leg position to the first leg position is prevented via abutment of the table top against the seat.

Preferably, the table leg comprises one or more protrusions for abutment with the seat and for preventing movement of the table leg from the second leg position to the first leg position via abutment of the one or more protrusions with the seat.

Preferably, the table leg comprises one or more protrusions for abutment with a seat back of the seat and for preventing movement of the table leg from the second leg position to the first leg position via abutment of the one or more protrusions with the seat back.

Preferably, the seat comprises a frame and the first connector is for connecting the table leg in pivotable engagement with the frame.

Preferably, the seat comprises a second mating part for engagement with a first mating part of the first connector.

Preferably, the second mating part is on the frame of the seat.

Preferably, the second mating part is a male mating part.

Alternatively, the second mating part is a female mating part.

Preferably, the female mating part comprises a recess for engagement with the male mating part.

Preferably, the female mating part comprises a C-shaped recess for engagement with the male mating part.

Preferably, the male mating part comprises a bar or protrusion, for example a pivot pin.

Preferably, the female mating part comprises an insert for engagement with the male mating part.

Preferably, the insert is a bearing insert for rotatable engagement with the male mating part.

Preferably, the female mating part comprises a recess and the insert comprises a collar positioned within the recess.

Preferably, the seat comprises a second mating part for engagement with a first mating part on the securing means.

Preferably, the second mating part is on the frame of the seat.

Preferably, the second mating part is a male mating part.

Alternatively, the second mating part is a female mating part.

Preferably, the female mating part comprises a recess for engagement with the male mating part.

Preferably, the female mating part comprises a channel for engagement with the male mating part.

Preferably, the channel is a curved channel.

Preferably, the channel is curved around a pivot point of the first connector.

Preferably, the channel comprises a stop for abutment with the male mating part and for restricting pivotable movement of the table leg.

Preferably, the channel comprises an entrance for receiving the male mating part.

Preferably, the entrance is positioned at a first end of the channel and a stop for abutment with the male mating part is positioned at a second end of the channel.

Preferably, the second mating part is a female mating part and the entrance is provided in a forward facing edge of the seat, preferably the frame.

Preferably, the entrance is flared. Preferably, a lower edge of the entrance is flared. This is particularly advantageous since it improves the ease of mating of the channel with a male mating part.

Preferably, the male mating part comprises a bar or protrusion, for example a stop pin.

Preferably, the second mating part is a male mating part and comprises a bar or protrusion on the seat, preferably the frame.

According to a further aspect of the present invention, there is provided a row of seats comprising a plurality of seats as described herein.

Preferably, the seat or row of seats comprises a vehicle seat or seats, preferably an aircraft seat or seats.

It will be appreciated that reference to "one or more" includes reference to "a plurality".

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

BRIEF DESCRIPTION OF THE DRAWINGS

Example embodiments of the present invention will now be described with reference to the accompanying Figures, in which.

DETAILED DESCRIPTION

The present invention relates to table legs for tables provided on the rear of seats, in particular aircraft seats.

Figure 1:
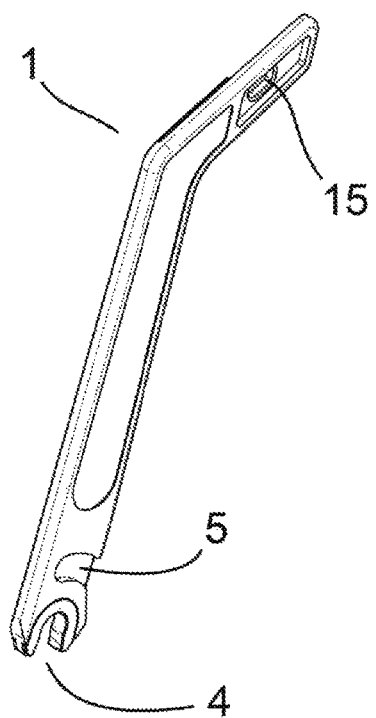
FIG. 1 shows a table leg in accordance with the present invention.
Figure 2A:
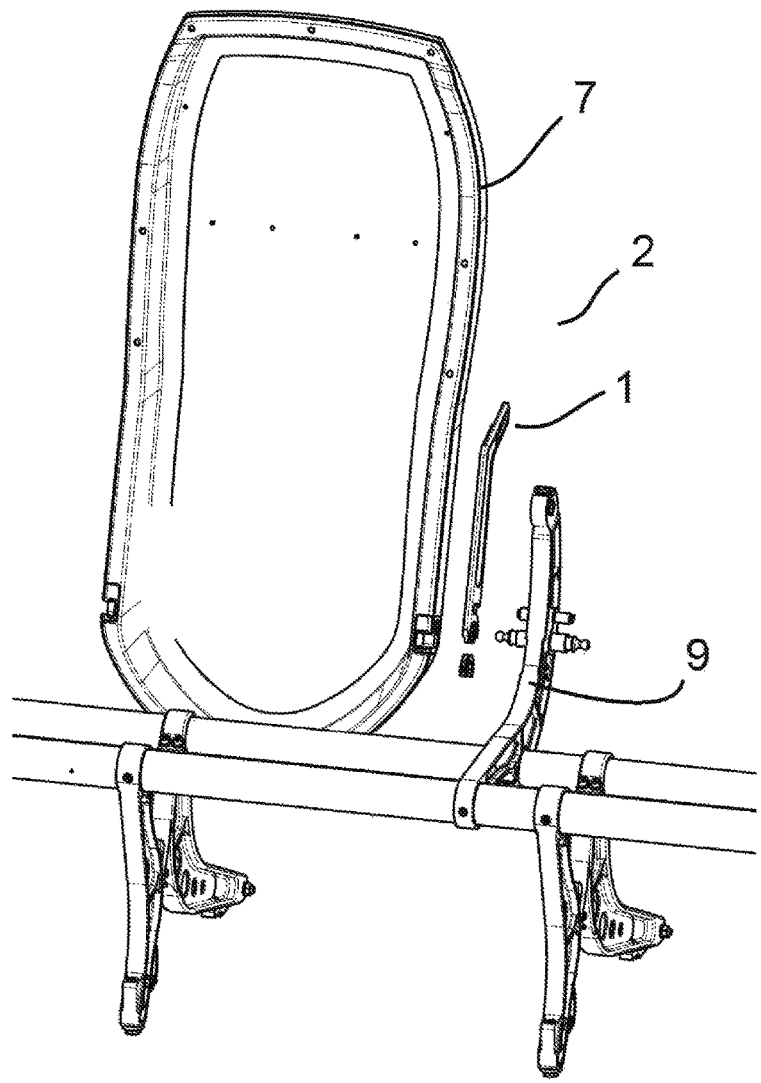
FIG. 2A shows an exploded view of a table leg of the present invention attached to the frame of an aircraft seat.
Figure 2B:
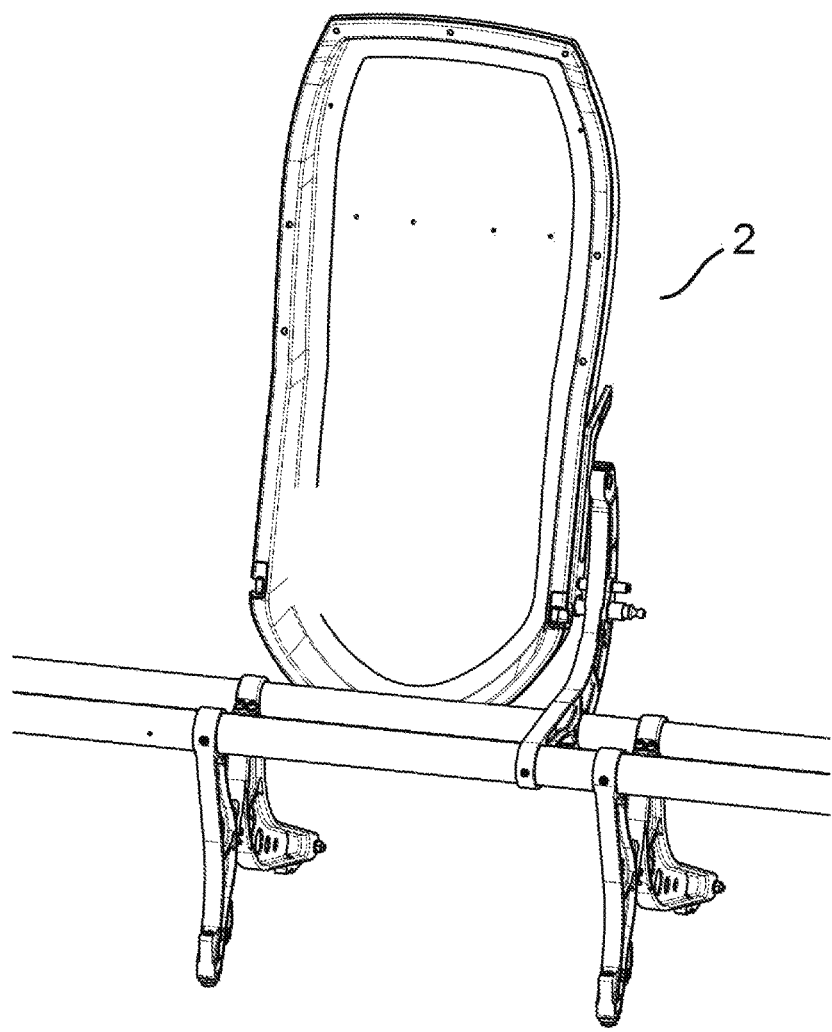
FIG. 2B shows an non-exploded view of a table leg of the present invention attached to the frame of an aircraft seat.

With reference to FIG. 1, there is shown a table leg 1 for attachment to the rear of an aircraft seat 2 and for supporting a table top 3. The table leg includes a first connector 4 for connecting the table leg 1 in pivotable engagement with a seat 2 such that the table leg 1 is pivotable between first (FIG. 3E) and second leg positions (FIG. 3F). A securing means 5 is provided for restricting movement of the table leg 1 relative to the seat 2. The securing means 5 allows removal of the table leg 1 from the seat 2 when the table leg 1 is in the first leg position and prevents removal of the table leg 1 from the seat 2 when the table leg 1 is in the second leg position. In the example shown, the first leg position is a maintenance position and the second leg position is an "in use" position.

In the example shown, the table leg 1 is connected to a table top 3 and movement of the table leg 1 from the second leg position to the first leg position is prevented via abutment of the table top 3 against the seat back 7. This further aided by the provision of protrusions 6 which abut the seat back and prevent movement of the table leg 1 from the second leg position to the first leg position when the table leg 1 is connected to the seat and the seat back 7 is in an upright position. In this respect, the seat back 7 is pivotable between first and second seat back positions and is pivoted forward in the first seat back position and substantially upright in the second seat back position. In the event that the table leg 1 is to be removed or installed, the seat back 7 is moved forward allowing removal or installation of the table leg 1. It will be appreciated that in embodiments in which the protrusions 6 are not provided, or if the table leg 1 is disconnected from the protrusions 6, when the table leg 1 is not connected to the table top 3, the table leg 1 is free to move from the second leg position to the first leg position for removal thereof.

Conveniently, the first connector 4 can be slid or pulled out of engagement with the seat 2 when the table leg 1 is in the first leg position.

The first connector 4 comprises a female mating part in the form of C-shaped recess 4 for engagement with a male part in the form of a bar/pivot pin 8 on the frame 9 of the seat 2. A bearing insert 10 in the form of a collar is provided in the C-shaped recess for rotatable engagement with the bar/pivot pin 8.

The securing means 5 comprises a female mating part in the form of a curved channel 5 for engagement with the male mating part 11 in the form of a second bar/stop pin 11 on the frame of the seat 2.

The channel 5 is curved around a pivot point of the first connector 4 and comprises a stop 12 for abutment with the second bar/stop pin 11 and thus restricting pivotable movement of the table leg 1.

The channel 5 comprises a flared entrance 13 for receiving the second bar 11 at first end of the channel with the stop 12 positioned at a second end of the channel. The entrance 13 is provided in a rearward facing edge 14 of the table leg 1.

The table leg 1 is provided with a second connector 15 for connecting the table leg 1 to a table top 3.

Figures 3A, 3B:
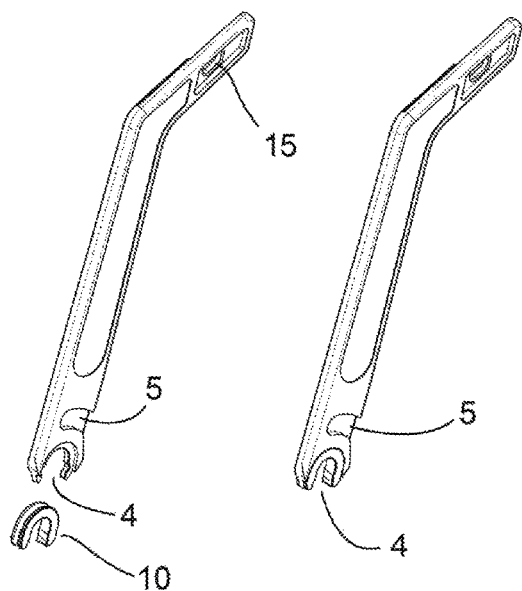
FIGS. 3A to 3G show steps of installation of a table leg of the present invention to an aircraft seat.
Figures 3C, 3D:
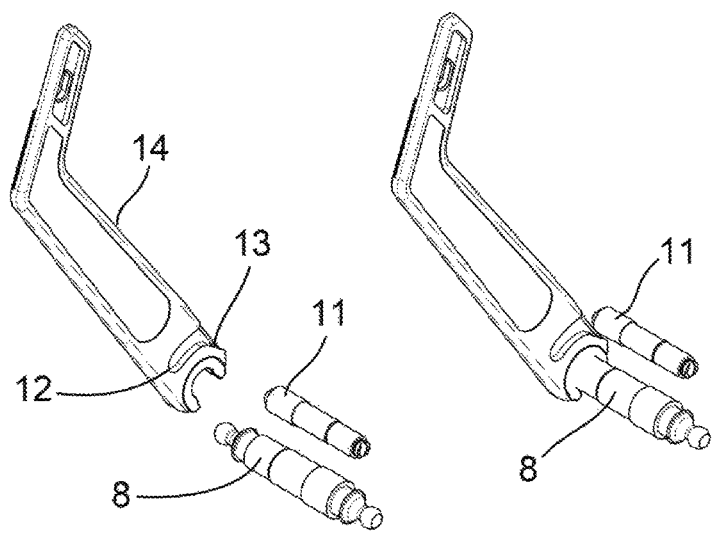
Figure 3E:
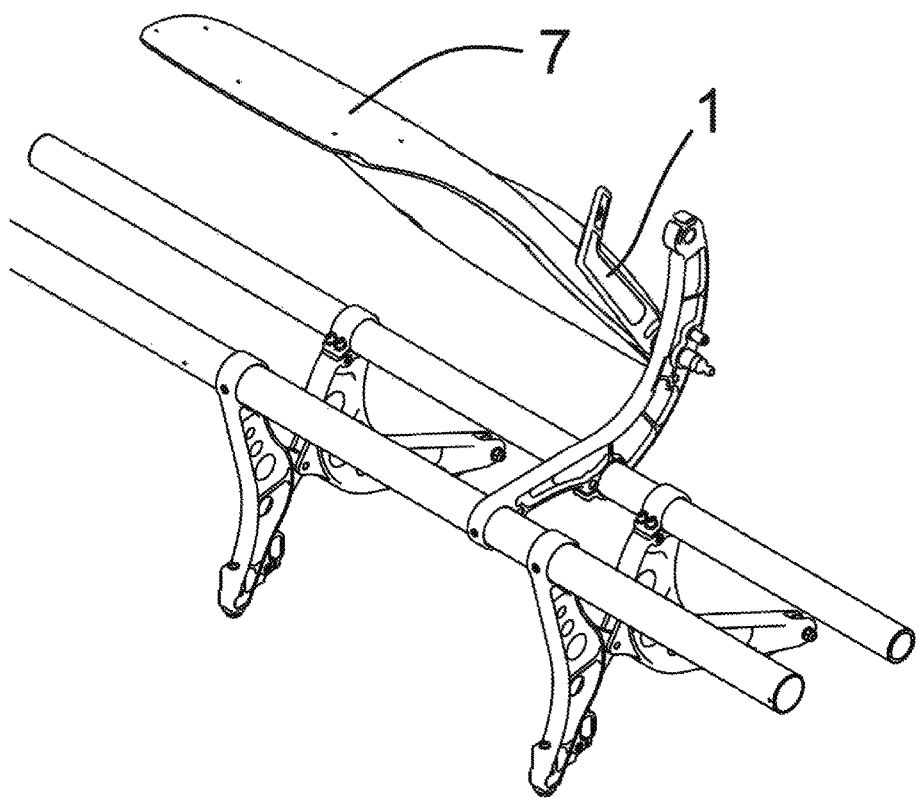
Figure 3F:
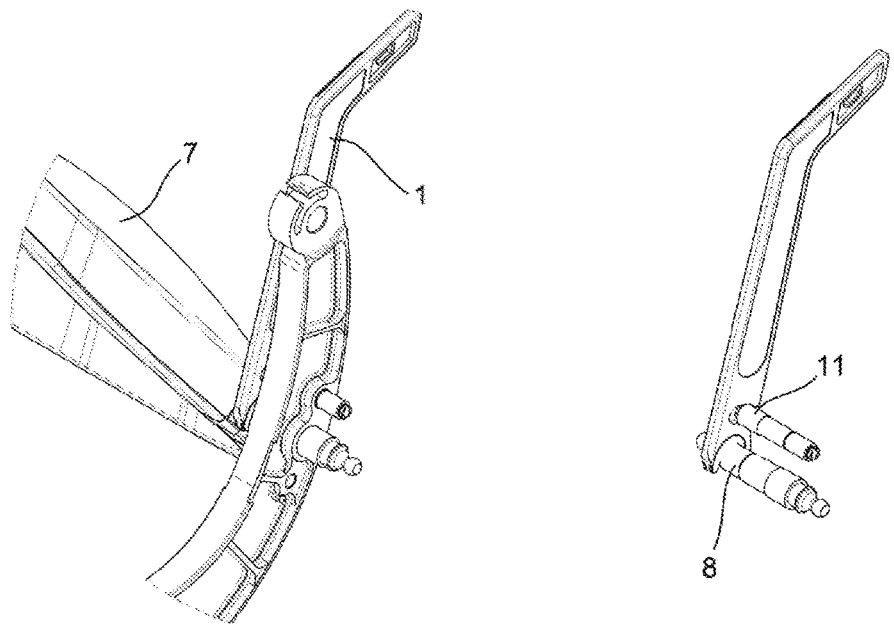
Figure 3G:
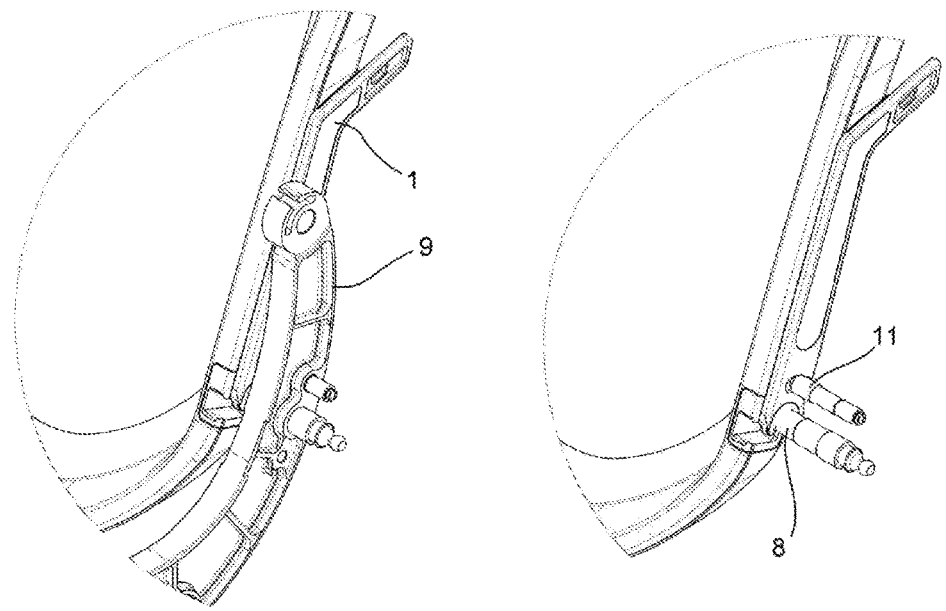
Figure 4A:
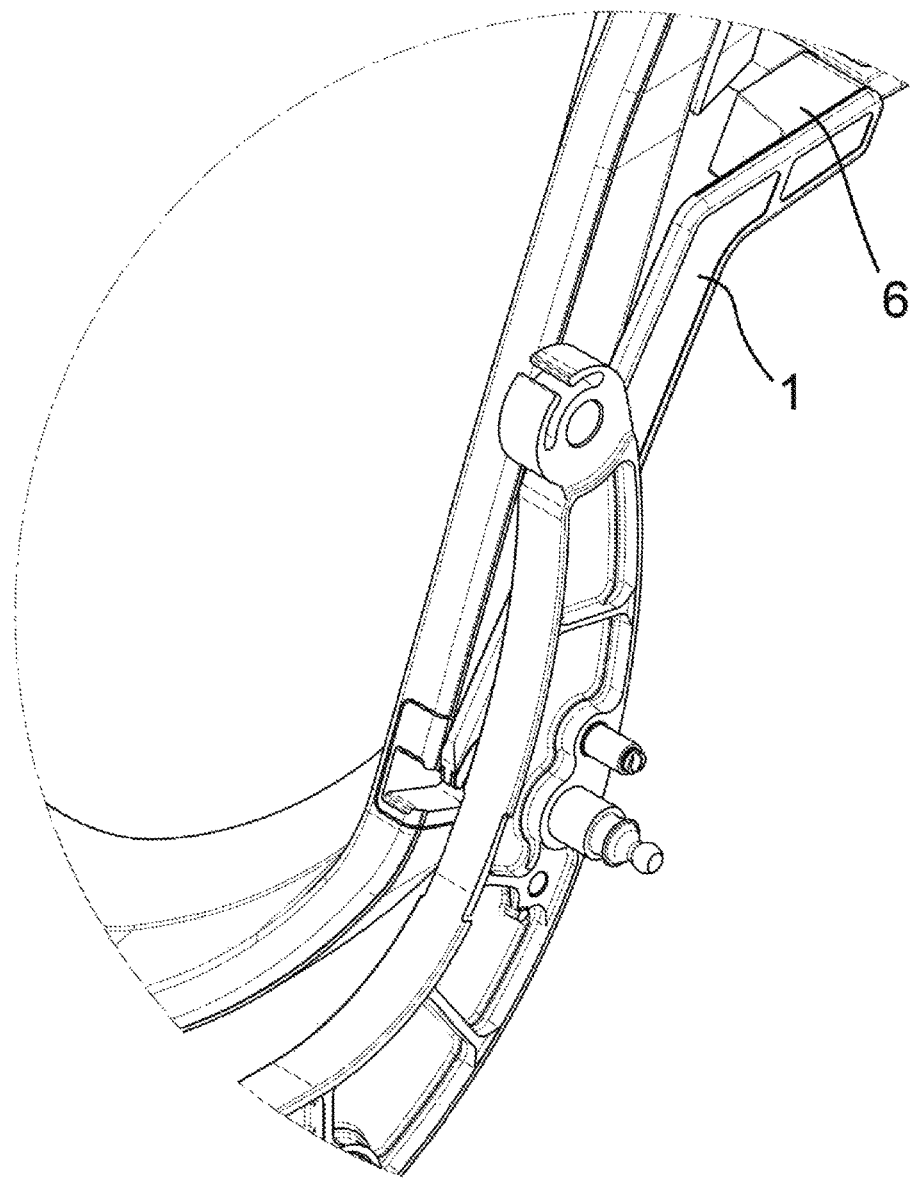
FIGS. 4A and 4B show the table leg of the present invention attached to an aircraft seat with the table top also visible.
Figure 4B:
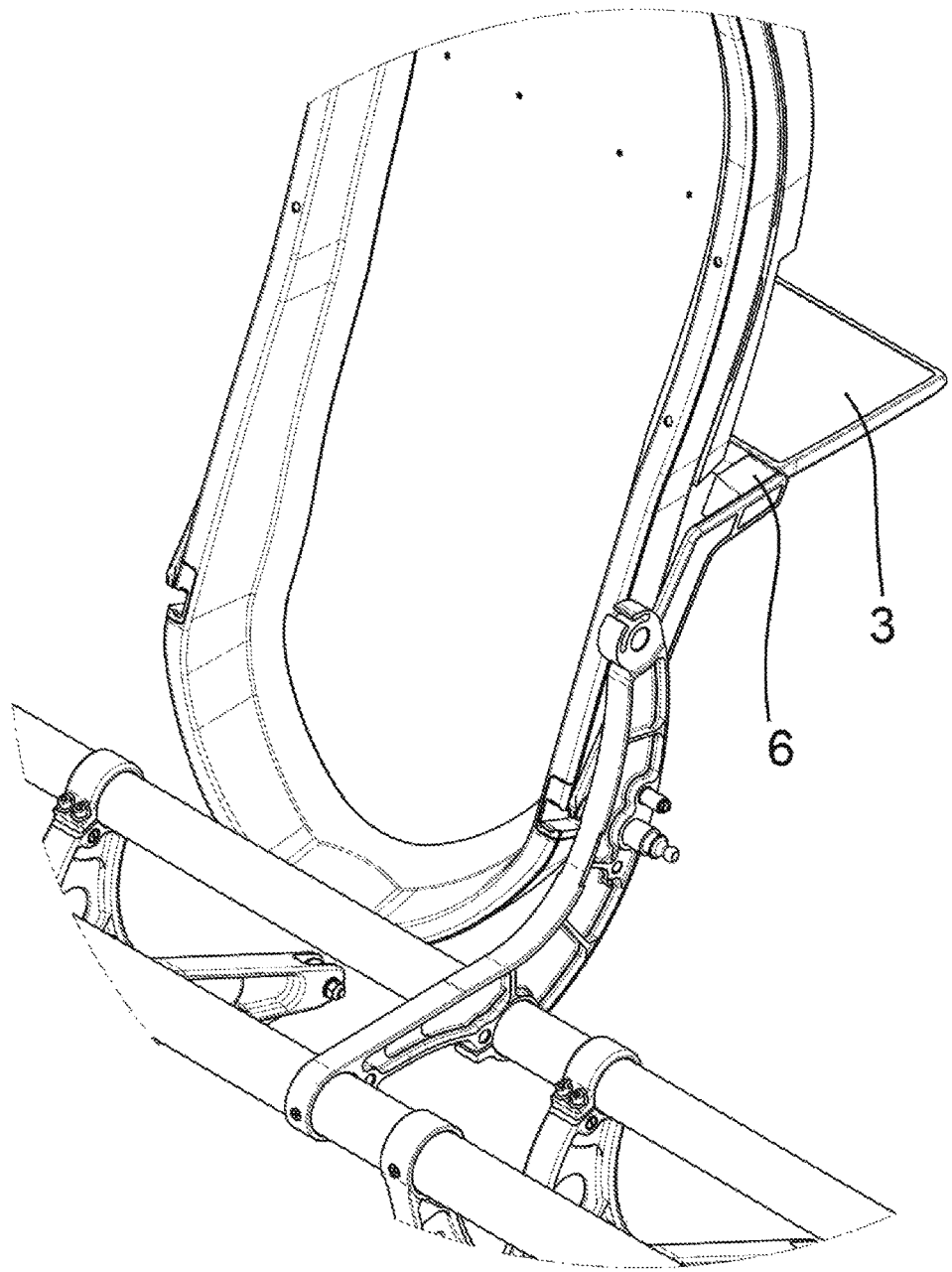
Figure 5A:
FIGS. 5A and 5B show a row of seats comprising the table leg.
Figure 5B:
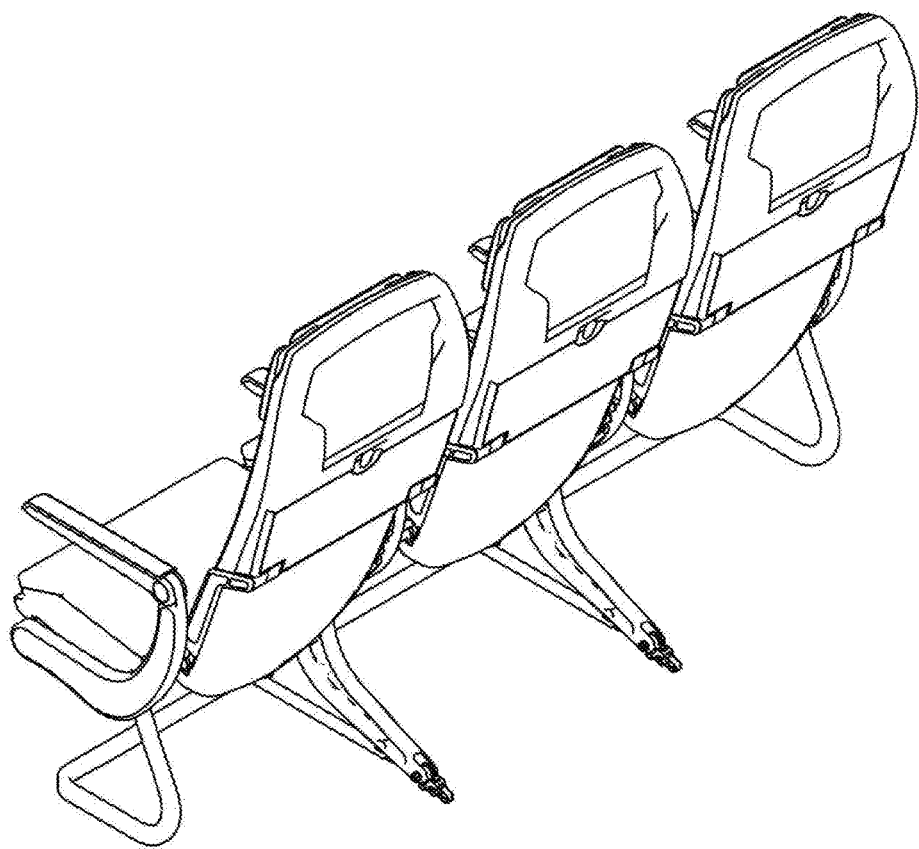

With reference to FIGS. 3A to 3G, the steps of installation of a table leg to an aircraft seat are shown. A collar 10 is snap-fitted into the C-shaped recess 4 of the table leg 1 (FIGS. 3A, 3B) and then, with the seat back pivoted forward, the table leg is snap-fitted to a pivot pin 8 positioned on the seat frame 9 (FIG. 3C, 3D). This means that the curved channel 5 is clear of the stop pin 11. FIG. 3E is a repeat of FIG. 3D with the seat back 7 and frame 9 visible. The table leg 1 is then moved from the first position to the second position allowing the curved channel 5 to engage the stop pin 11 (FIG. 3F). In this position, the presence of the stop pin 11 within the curved channel 5 prevents the table leg 1 from disengaging the pivot pin 8. The seat back 7 is then pivoted into an upright position (FIG. 3F). As shown in FIGS. 4A and 4B, with the seat back 7 in an upright position, pivotable movement of the table leg 1 forward to the first position is prevented by abutment of protrusions 6 and the table top 3 against the rear of the seat back 7.

The present invention provides a significant advantage over known methods of attaching table legs to aircraft seats. Remarkably, there is no need for a connection means to be provided which requires an engineer to tighten and/or provide a nut and bolt or screw. The table leg of the present invention is provided with a connection means that cannot be over-tightened, under-tightened or incorrectly installed; rather, an engineer simply needs to position the table leg in the first leg position and move it into engagement with a seat. Once in engagement with the seat, movement of the table leg from the first leg position to the second leg position locks the table leg in connection with the seat. In the event that the table leg requires replacement or repair, an engineer can quickly and easily remove the table leg by moving the table leg from the second leg position to the first leg position.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

The invention claimed is:

1. A table leg comprising a first connector for connecting the table leg in pivotable engagement with a seat when the table leg is coupled to the seat such that the table leg is pivotable between first and second leg positions, and a securing means for restricting movement of the table leg relative to the seat, wherein the securing means allows removal of the table leg from the seat with the table leg in the first leg position and prevents removal of the table leg from the seat with the table leg in the second leg position, wherein the securing means comprises a first mating part for engagement with a second mating part on the seat, wherein the first mating part is a female mating part and the second mating part is a male mating part or wherein the first mating part is a male mating part and the second mating part is a female mating part, wherein the female mating part comprises a channel for engagement with the male mating part, and wherein said channel is curved around a pivot point of the first connector.

2. A table leg according to claim 1, wherein when the table leg is coupled to the seat the first connector can be slid or pulled out of engagement with the seat when the table leg is in the first leg position.

3. A table leg according to claim 1, wherein when the table leg is coupled to the seat the seat is configured for controlling movement of the table leg between said first and second leg positions.

4. A table leg according to claim 1, wherein the table leg is connected to a table top and movement of the table leg from the second leg position to the first leg position is prevented via abutment of the table top against the seat when the table leg is coupled to the seat.

5. A table leg according to claim 1, wherein the table leg comprises one or more protrusions for abutment with the seat and for preventing movement of the table leg from the second leg position to the first leg position via abutment of the one or more protrusions with the seat, when the table leg is connected to the seat.

6. A table leg according to claim 1, wherein the first connector is for connecting the table leg in pivotable engagement with a frame of the seat.

7. A table leg according to claim 1, wherein the first connector comprises a first mating part for engagement with a second mating part on the seat.

8. A table leg according to claim 1, wherein the channel comprises a stop for abutment with the male mating part and for restricting pivotable movement of the table leg.

9. A table leg according to claim 1, wherein the channel comprises an entrance for receiving the male mating part.

10. A table leg according to claim 9, wherein the entrance is positioned at a first end of the channel and a stop for abutment with the male mating part is positioned at a second end of the channel.

11. A table leg according to claim 9, wherein the first mating part is a female mating part and the entrance is provided in a longitudinal edge of the table leg.

12. A table leg according to claim 9, wherein the entrance is flared.

13. A table leg according to claim 12, wherein a lower edge of the entrance is flared.

14. A table comprising one or more table legs according to claim 1.

15. A seat comprising one or more tables according to claim 14.

* * * * *